(12) United States Patent
Korf et al.

(10) Patent No.: US 10,112,849 B2
(45) Date of Patent: Oct. 30, 2018

(54) SYSTEM AND METHOD FOR TREATING CONTAMINATED WASTEWATER

(71) Applicant: Robert Bosch GmbH, Stuttgart (DE)

(72) Inventors: Philipp Korf, Grossbottwar (DE); Michael Pettersch, Kortnal-Muenchingen (DE); Josef Schwendele, Geislingen (DE); Darius Jung, Stuttgart (DE); Juergen Korz, Vaihingen/Enz (DE); Bernhard Mutschler, Gerlingen (DE); Dimitri Sachs, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 326 days.

(21) Appl. No.: 14/899,387

(22) PCT Filed: May 27, 2014

(86) PCT No.: PCT/EP2014/060939
§ 371 (c)(1),
(2) Date: Dec. 17, 2015

(87) PCT Pub. No.: WO2014/202349
PCT Pub. Date: Dec. 24, 2014

(65) Prior Publication Data
US 2016/0185627 A1    Jun. 30, 2016

(30) Foreign Application Priority Data
Jun. 17, 2013  (DE) .................. 10 2013 211 252

(51) Int. Cl.
*C02F 11/00*  (2006.01)
*C02F 1/52*  (2006.01)
(Continued)

(52) U.S. Cl.
CPC ............ *C02F 1/444* (2013.01); *B01D 61/145* (2013.01); *B01D 61/16* (2013.01); *B01D 61/18* (2013.01);
(Continued)

(58) Field of Classification Search
CPC ............ B01D 2311/04; B01D 2311/06; B01D 2311/08; B01D 2311/25;
(Continued)

(56) References Cited

U.S. PATENT DOCUMENTS 5,772,900 A * 6/1998 Yorita ................. B01D 17/00
210/805
6,245,121 B1 * 6/2001 Lamy ................. B01D 61/04
71/1
(Continued)

FOREIGN PATENT DOCUMENTS

CN    102285735 A    12/2011
CN    102408167 A    4/2012
(Continued)

OTHER PUBLICATIONS

International Search Report for Application No. PCT/EP2014/060939 dated Jul. 28, 2014 (English Translation, 3 pages).

*Primary Examiner* — Pranav N Patel
(74) *Attorney, Agent, or Firm* — Michael Best & Friedrich LLP

(57) ABSTRACT

The invention relates to a system for treating contaminated wastewater, comprising a feed line (3) that leads into a separator (5) and a discharge line (10) that leaves the separator, which discharge line leads directly or indirectly into an access line (16) into an ultrafiltration system (18), wherein the ultrafiltration system (18) has a permeate outlet line (19) and a concentrate outlet line (17). According to the invention, a system and a method for treating contaminated
(Continued)

wastewater that operate effectively and reliably with low component complexity are provided or specified. This is achieved in that the permeate outlet line (19) can be connected to the feed line (3) in a controllable manner. According to the corresponding method, water separated from the wastewater in the separator (5) exits into a discharge line (10), and the water is then fed to an ultrafiltration system (18), in which the water is separated into a concentrate discharged into a concentrate outlet line (17) and a permeate discharged into a permeate outlet line (19), wherein the permeate can be fed back into the feed line (3) of the separator (5) for reaction with a supplied precipitant, and heavy metal, for example, is separated from the permeate in the separator (5).

14 Claims, 1 Drawing Sheet

(51) Int. Cl.
| | | |
|---|---|---|
| | *C02F 1/44* | (2006.01) |
| | *B01D 61/14* | (2006.01) |
| | *B01D 61/16* | (2006.01) |
| | *C02F 1/38* | (2006.01) |
| | *B01D 61/18* | (2006.01) |
| | *B01D 61/20* | (2006.01) |
| | C02F 1/00 | (2006.01) |
| | C02F 101/20 | (2006.01) |
| | C02F 101/32 | (2006.01) |

(52) U.S. Cl.
CPC ............... *B01D 61/20* (2013.01); *C02F 1/38* (2013.01); *C02F 1/52* (2013.01); *C02F 11/00* (2013.01); *B01D 2311/04* (2013.01); *B01D 2311/06* (2013.01); *B01D 2311/08* (2013.01); *B01D 2311/246* (2013.01); *B01D 2311/25* (2013.01); *B01D 2311/2642* (2013.01); *B01D 2311/2676* (2013.01); *B01D 2313/50* (2013.01); *C02F 1/008* (2013.01); *C02F 1/5209* (2013.01); *C02F 2101/20* (2013.01); *C02F 2101/32* (2013.01); *C02F 2209/003* (2013.01); *C02F 2209/02* (2013.01); *C02F 2209/06* (2013.01); *C02F 2209/42* (2013.01); *C02F 2301/046* (2013.01)

(58) Field of Classification Search
CPC .... B01D 2311/2642; B01D 2311/2672; B01D 2311/246; B01D 2313/50; B01D 61/145; B01D 61/16; B01D 61/18; B01D 61/20; B01D 61/02; B01D 61/04; B01D 61/08; B01D 61/10; B01D 61/12; C02F 11/00; C02F 1/008; C02F 1/38; C02F 1/444; C02F 1/52; C02F 1/5209; C02F 2101/20; C02F 2101/32; C02F 2301/046
See application file for complete search history.

(56) References Cited

U.S. PATENT DOCUMENTS

| | | | | |
|---|---|---|---|---|
| 2003/0132167 | A1* | 7/2003 | Haase | C02F 1/008 |
| | | | | 210/696 |
| 2007/0295650 | A1* | 12/2007 | Yoneda | B01D 61/025 |
| | | | | 210/97 |
| 2011/0056878 | A1* | 3/2011 | Matsushiro | B01D 61/022 |
| | | | | 210/257.2 |

FOREIGN PATENT DOCUMENTS

| | | |
|---|---|---|
| DE | 102011011293 | 8/2011 |
| EP | 0567914 | 11/1993 |
| EP | 0715902 | 6/1996 |
| JP | S59155596 U | 10/1984 |
| JP | H08965 A | 1/1996 |
| JP | 2002307058 A | 10/2002 |
| JP | 2003236558 | 8/2003 |
| JP | 2006167611 | 6/2006 |
| JP | 2012196678 A | 10/2012 |
| WO | 2013031689 | 3/2013 |

* cited by examiner

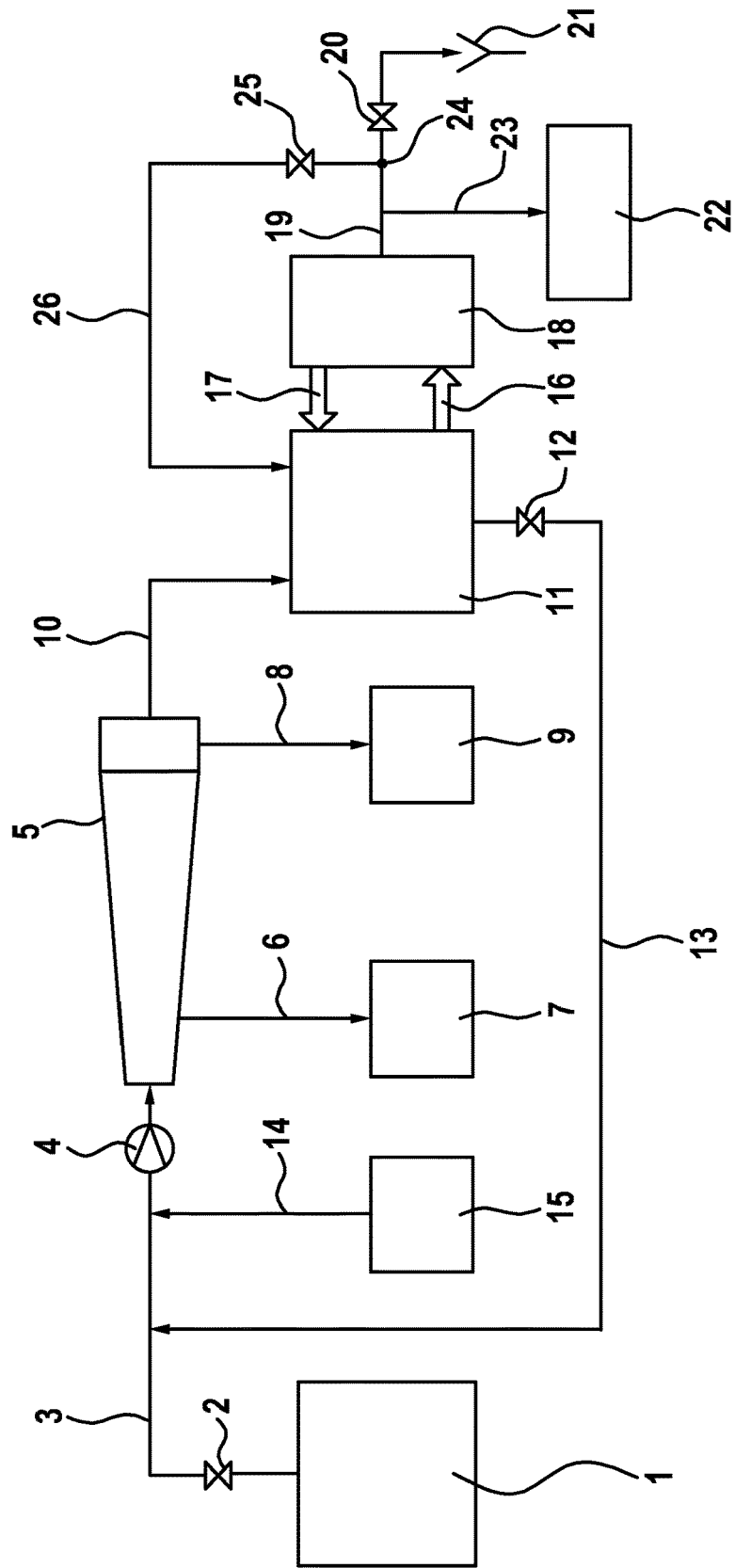

SYSTEM AND METHOD FOR TREATING CONTAMINATED WASTEWATER

BACKGROUND OF THE INVENTION

The invention relates to a system for treating contaminated wastewater, comprising a feed line that leads into a separator and a discharge line that leaves the separator, which discharge line leads directly or indirectly into an access line into an ultrafiltration system, wherein the ultrafiltration system has a permeate outlet line and a concentrate outlet line. The invention further relates to a method for treating contaminated wastewater.

Such a system and such a method are known from the European patent publication EP 0 715 902 A1. This method and this system are designed to thermally separate toxic substances from contaminated material to be treated. In so doing, the material to be treated is initially treated with superheated steam by said material being led through a corresponding evaporation apparatus. The material to be treated is subsequently fed to a condenser to which a separator designed as a three-phase separator is connected. This three-phase separator has a feed line, by means of which contaminated wastewater separated from the material to be treated is fed to the three-phase separator. The at least pre-treated wastewater is discharged as water out of the separator via a discharge line which is directly connected to an access line of a filtration system designed as an ultrafiltration system. The permeate leaving the ultrafiltration system via a permeate outlet line is subsequently fed to an apparatus for reverse osmosis and to a subsequent system for thermal degasification.

SUMMARY OF THE INVENTION

The aim underlying the invention is to provide or specify a system and a method for treating contaminated wastewater which operate effectively and reliably with low component complexity.

This aim is met according to the invention due to the fact that the permeate outlet line can be connected to the feed line in a controllable manner. The corresponding method for treating contaminated wastewater provides that the permeate can be fed back into the feed line of the separator. By virtue of the fact that the permeate can be fed back into the feed line in a controllable manner, it is possible to refeed the permeate to separate the foreign constituents that are, for example, still present in the permeate and relate, for example, to heavy metals in, e.g, the form of sludge. As a result, an effective utilization of the system is possible which furthermore operates reliably. The wastewater is not exclusively a wastewater in the form of contaminated $H_2O$ but can also be virtually any liquid or emulsion which is contaminated with, for example, particulate matter and oils as well as, as the case may be, with further substances. In this respect, the term wastewater is to be understood as a generic term within the scope of the invention.

A working tank is disposed between the discharge line and the access line in a modification to the invention, wherein the permeate outlet line can be connected to the working tank in an arbitrary manner in a general design. The working tank is thereby heated, for example, to a constant temperature of 50° Celsius by a heating device. The (pre-treated) water, which leaves the separator via the discharge line and has been separated from the wastewater, as well as, in particular, the permeate along with, if required, a concentrate leaving the filtration system is collected in said working tank.

In a modification to the invention, the working tank is connected to the feed line via a return line. The water or the permeate (along with the concentrate) is fed back into the feed line to the separator via this return line.

In order to be able to control this return of water, a return check valve is in turn disposed in the return line in a further embodiment of the invention. In the event that the return check valve is open, a feed check valve, which connects a buffer tank for contaminated wastewater to the feed line, is closed. As a result, the water leaving the separator and the concentrate leaving the filtration system can pass through the separator (and the filtration system) until achieving a predetermined degree of separation. In addition, the permeate can also, according to the invention, be fed back into the separator in order, for example, to separate heavy metal therefrom.

In a modification to the invention, the permeate outlet line has an analysis device, in particular for heavy metals. This analysis device preferably continuously monitors the permeate leaving the filtration system to determine whether a limit value has been exceeded, in particular for heavy metals. The analysis device can, however, also be designed to detect other materials or substances which are to be separated out of the permeate.

Provision is made in a modification to the invention for a return flow line, which is controlled by a return flow line valve and leads into the working tank, to branch off at a junction downstream of the analysis device of the permeate outlet. If the analysis device detects that a limit value, for example for heavy metals, has been exceeded, the return flow valve is opened and simultaneously a permeate discharge valve is closed, which is provided in a further embodiment of the invention and is disposed downstream of the junction of the return flow line and the permeate outlet line. In this operating state, the permeate that is, for example, contaminated with heavy metals is then fed back into the working tank and further via the return flow line into the feed line. In the process, a precipitant is then in turn, in a further configuration of the invention, introduced via a precipitant line which likewise leads into the feed line. This precipitant, which is introduced by means of the precipitant line likewise into the feed line in close proximity to where the return flow line opens into said feed line, reacts with the permeate which has been introduced into the feed line, wherein the feed line is used as a reaction zone in this operating state. The reaction product is fed to the separator in which the heavy metal is separated as sludge or oil sludge and thus extracted from the water leaving the separator. In a subsequent pass through the filtration system, the permeate leaving the filtration system falls below a predetermined limit value with regard to a heavy metal contamination, and the return of the permeate can be concluded by closing the return flow line valve and opening the permeate discharge valve. At the same time, the feed of precipitant into the feed line to the separator is stopped.

In a modification to the invention, the separator is a three-phase separator particularly for sludge and oil which are released from the contaminated wastewater. The sludge is collected in a collecting tank connected to the three-phase separator and the oil in an oil collecting tank and disposed of, if required.

In a modification to the invention, the filtration system is an ultrafiltration system with which macromolecular substances and small particles can be separated from the supplied medium and also concentrated using a filtration method from the field of membrane technology. The system and the method are basically suited to "purifying" an arbitrary contaminated wastewater, wherein the term wastewater—as described above—is not limited to a fluid in the form of $H_2O$. Other constituents in the form of oil can likewise be separated in the separator in addition to the sludge which contains virtually any separated solid materials that form the sludge with a small residual amount of wastewater.

If the working tank is subsequently emptied to a predetermined level due to separation by the separator and discharge of permeate into an outlet, the return check valve is closed and the feed check valve is opened. As a result, the separator and subsequently the working tank are refilled. This process is repeated until the membranes of the filtration system have to be cleaned, for example rinsed, due to contamination.

Further advantageous embodiments of the invention ensue from the description of the drawings, in which an exemplary embodiment of the invention that is depicted in the drawings is explained in detail.

BRIEF DESCRIPTION OF THE DRAWINGS

The single FIG. 1 shows a schematic depiction of the system for treating contaminated wastewater with the individual components.

DETAILED DESCRIPTION

FIG. 1 shows a system for treating contaminated wastewater with the required components. At the beginning of the system, a buffer tank 1 is connected via a feed check valve 2 comprising a feed line 3, in which a pump 4 is inserted, to a separator 5 in the form of a three-phase separator (for example designed as a so-called tricanter). A contaminated wastewater from an industrial plant is stored in the buffer tank 1, the wastewater containing in particular solid materials and oil as well as, as the case may be, further substances, for example heavy metals. The wastewater is not exclusively a wastewater in the form of contaminated $H_2O$ but can also be virtually any liquid or emulsion which is, for example, contaminated with solid materials and oil as well as, as the case may be, with further substances. In this sense, wastewater is to be understood here as a generic term. The wastewater can also be contaminated with another fluid besides oil, which is to be separated out of the wastewater in addition to the solid materials. It is also conceivable that a plurality of fluids contaminates the wastewater which can, however, be collectively separated from said wastewater. Solid materials can, for example, be metallic materials or plastic materials, which together with the wastewater form a sludge.

In the exemplary embodiment depicted, a sludge discharge line 6 is connected to the three-phase separator 5, said discharge line leading into a sludge tank 7. The solid materials are consequently gathered together with a residual amount of wastewater in the form of sludge in the sludge tank 7. In addition, an oil discharge line 8, which leads into an oil reservoir 9, is connected to the three-phase separator 5. The three-phase separator 5 operates according to the principle of a separation by means of centrifugal forces, wherein different phases of varying thicknesses are separated from one another. In the present exemplary embodiment, sludge and oil are accordingly separated from the contaminated wastewater which leaves the three-phase separator 5 via a discharge line 10 as treated wastewater in the form of water. In the process, residues of sludge and oil as well as, as the case may be, further substances are contained in the water leaving the three-phase separator 5 via the discharge line 10 after a one-time pass. The discharge line 10 is connected to a working tank 11 into which the water is introduced. The working tank 11 is connected to a return line 13 via a return valve 12, said return flow line leading into the feed line 3 downstream of the feed check valve 2. In addition, a precipitant line 14, which is connected to a precipitant tank 15, leads into the feed line 3 downstream of the return line 13. The precipitant situated in the precipitant tank 15 can, as required, be introduced into the feed line 3. This will later be further described.

The working tank 11 is furthermore connected to a filtration system 18 in the form of an ultrafiltration system via a feed line 16 and a concentrate outlet line 17. By means of the ultrafiltration system, particles in a size of approximately 0.1 to 0.01 μm can be separated from the supplied fluid, which is initially the water leaving the separator 5. These particles form the concentrate, which in turn is supplied to the working tank 11 via the concentrate outlet line 17. The filtration system 18 further comprises a permeate outlet line 19, by means of which the permeate, which is again treated water in the present exemplary embodiment, leaves said filtration system 18. The permeate outlet line 19 is connected via a permeate discharge valve 20 to an outlet 21 for the definitively treated water. An analysis device 22, with which the permeate flowing through the permeate outlet line 19 is analyzed for the presence of certain contaminants, is engaged directly or via a stub 23 in the permeate outlet line 19. These contaminants are heavy metals in the exemplary embodiment, wherein the analysis device 22 determines or, respectively, measures whether a predetermined concentration of heavy metals in the permeate has been exceeded. A junction 24 is disposed downstream of the analysis device 22 or, respectively, the stub 23 to the analysis device 22, said junction being connected via a return flow line valve 25 to a return flow line 26 which in turn leads into the working tank 11.

The functioning of the system and the method for treating contaminated wastewater is likewise described below with the aid of the drawing which also represents a flow diagram. Contaminated wastewater is initially supplied from the buffer tank 1 to the separator 5 in which sludge and oil are separated from the contaminated wastewater. The treated wastewater leaves the separator as (at least) partially purified water, and such an amount of contaminated wastewater is supplied to the working tank 11 until the same is filled. After the working tank 11 has been filled, which incidentally is heated to a temperature that is constantly at 50° Celsius by means of, for example, a heating device, the feed check valve 2 is closed and the return check valve 12 is opened; thus enabling the separator 5 to be fed in the circuit from the working tank 11. Subsequently, the filtration system 18 is (additionally) brought into operation. The filtration system 18 separates concentrate from the supplied (still slightly contaminated) water which is fed back into the working tank 11. The subsequently purified water (purified according to defined guideline criteria) leaves the filtration system 18 and enters the outlet 21. During the filtration process, the oil concentration, in particular, increases in the working tank 11 so that free oil increasingly forms which is again supplied to the separator 5 via the return line 13 and is removed from said separator 5 into the oil reservoir 9.

The permeate is continuously monitored by the analysis device 22 for the presence of heavy metals. If a limit value for heavy metals has been exceeded in the permeate, the permeate discharge valve 20 closes and the return flow line valve 25 opens so that the permeate is fed back into the working tank 11 and no longer enters into the outlet 21. The permeate travels from the working tank 11 back into the feed line 3 to the separator 5 via the return line 13. In order to remove the heavy metals from the permeate which has been fed back, precipitants are introduced now in a metered manner from the precipitant tank 15, which is connected via the precipitant line 14 to the feed line 3, into the feed line 3, into which the contaminated permeate is introduced via the return line 13 in close proximity to where the precipitant line 14 leads into said feed line 3. In this operating state, the feed check valve 2 is accordingly closed and the return check valve 12 is open. The feed line 3 to the separator 5 is used in this operating state as a reaction zone for the precipitant chemicals with the permeate which has been fed back. In the separator 5, the sludge containing heavy metals is separated or drained into the sludge tank and/or the oil reservoir 9. The precipitant or precipitants are, for example, metered as a function of the heavy metal concentration and the pH level in the permeate.

If the heavy metal concentration sinks below the predetermined limit value in the permeate, which is continuously controlled by the analysis device 22, the permeate discharge valve 20 opens and the return flow line valve 25 is closed again. The permeate is consequently led into the outlet 21, while the metering of the precipitant is discontinued. If too high a heavy metal concentration is later measured again, the previously described process is once again initiated.

During the course of the process, the fill level in the working tank 11 progressively decreases as a result of the drainage of the permeate into the outlet 21. Upon reaching a predetermined minimum level, the working tank 11, as previously described, is refilled via the separator 5, wherein the feed check valve 2 opens again and the return check valve 12 closes.

As a whole, the process is so often repeated or resumed depending on whether the membranes of the filtration system 18 have to be cleaned or, for example, rinsed due to contamination.

What is claimed is:

1. A system for treating contaminated wastewater from a buffer tank (1), comprising a feed line (3) that leads into a separator (5) and a discharge line (10) that leaves the separator (5), wherein the discharge line (10) leads into a working tank (11), wherein an access line (16) extends from the working tank (11) into a filtration system (18) which has a permeate outlet line (19) and a concentrate outlet line (17), wherein the buffer tank (1) is connected to the feed line (3) via an inlet check valve (2), wherein the permeate outlet line (19) is connected to the feed line (3) in a controllable manner in order to feed permeate back to the feed line (3), wherein the working tank (11) is connected to the feed line (3) via a return line (13), wherein a return check valve (12) is arranged in the return line (13), wherein the concentrate outlet line (17) extends from the filtration system (18) and into the working tank (11), wherein the permeate outlet line (19) is connected to the working tank (11) via a return flow line (26), wherein the system includes a heavy metal analyzer (22) in communication with the permeate outlet line (19), and wherein a precipitant line (14) opens into the feed line (3) downstream of the return line (13).

2. The system according to claim 1, characterized in that the return flow line (26) is controlled by a return flow line valve (25) and branches off at a junction (24) downstream of the heavy metal analyzer (22) in the permeate outlet line (19).

3. The system according to claim 2, characterized in that the permeate outlet line (19) has a permeate discharge valve (20) downstream of the junction (24) of the return flow line (26).

4. The system according to claim 1, characterized in that the separator (5) is a three-phase separator.

5. The system according to claim 1, characterized in that the filtration system (18) is an ultrafiltration system.

6. The system according to claim 1, characterized in that the separator (5) is a three-phase separator for separating sludge and oil from the wastewater.

7. A method for treating contaminated wastewater, the method comprising providing the system according to claim 1, passing the contaminated wastewater to the separator (5) via the feed line (3), wherein water separated out of the contaminated wastewater exits from the separator into the discharge line (10), subsequently supplying the water to the filtration system (18) in which the water is separated into a concentrate discharged into the concentrate outlet line (17) and a permeate discharged into the permeate output line (19), and feeding the permeate back into the feed line (3) of the separator (5).

8. The method according to claim 7, characterized in that the discharged permeate is monitored by the heavy metal analyzer (22) to determine whether a limit value is present.

9. The method according to claim 8, characterized in that the permeate is fed back into the feed line (3) to the separator (5) and a precipitant is simultaneously supplied to the separator (5) when the limit value has been exceeded.

10. The method according to claim 9, characterized in that the precipitant is introduced into the feed line (3) by means of the precipitant line (14) in close proximity to where the return line (13) leads into said feed line (3) and in that the feed line portion between the separator and where the precipitant line meets the feed line is used as a reaction zone for the precipitant with the permeate.

11. The method according to claim 9, characterized in that the precipitant is metered as a function of a concentration and a pH value in the permeate.

12. The method according to claim 7, characterized in that the discharged permeate is monitored by the heavy metal analyzer (22) to determine whether a limit value is present for a heavy metal.

13. The method according to claim 9, characterized in that the heavy metal analyzer (22) determines whether the limit value is present for a heavy metal, and the precipitant is metered as a function of a concentration of the heavy metal and a pH value in the permeate.

14. The method according to claim 12, characterized in that the heavy metal is separated as sludge from the permeate in the separator (5).

* * * * *